United States Patent

Stryck

[15] 3,681,891
[45] Aug. 8, 1972

[54] METHOD FOR PACKAGING
[72] Inventor: Reinhold Friedrich Stryck, Gothenburg, Sweden
[73] Assignee: Elektriska Svetsningsaktiebolaget, Gothenburg, Sweden
[22] Filed: June 10, 1970
[21] Appl. No.: 45,045

[30] Foreign Application Priority Data
June 10, 1969 Sweden ..................... 8203/69

[52] U.S. Cl. .................................................. 53/30
[51] Int. Cl. ............................................. B65b 11/12
[58] Field of Search ......................... 53/30; 206/65 S

[56] References Cited
UNITED STATES PATENTS 3,206,020  9/1965  Billingsley et al. ......... 206/65 S
3,460,671  8/1969  Harm ......................... 206/65 S
3,047,140  7/1962  Robins .................... 206/65 S X Primary Examiner—Travis S. McGehee
Attorney—Cameron, Kerkam & Sutton

[57] ABSTRACT

A substantially prismatic or cylindrical article having two parallel, plane end faces is provided with a tubular sheath of a shrinkable plastic sheet material the end portions of which project beyond said end faces. The sheath is subjected to heat to make said end portions shrink into plane shape. The length of the projecting end portions is such that they when shrunk do not entirely cover the respective end faces. Prior to the heating step, a patch of plastic sheet material is applied to each of the end faces. After the heating step, each of the shrunk end portions of the sheath are welded on to the underlying plastic patch.

1 Claim, 4 Drawing Figures

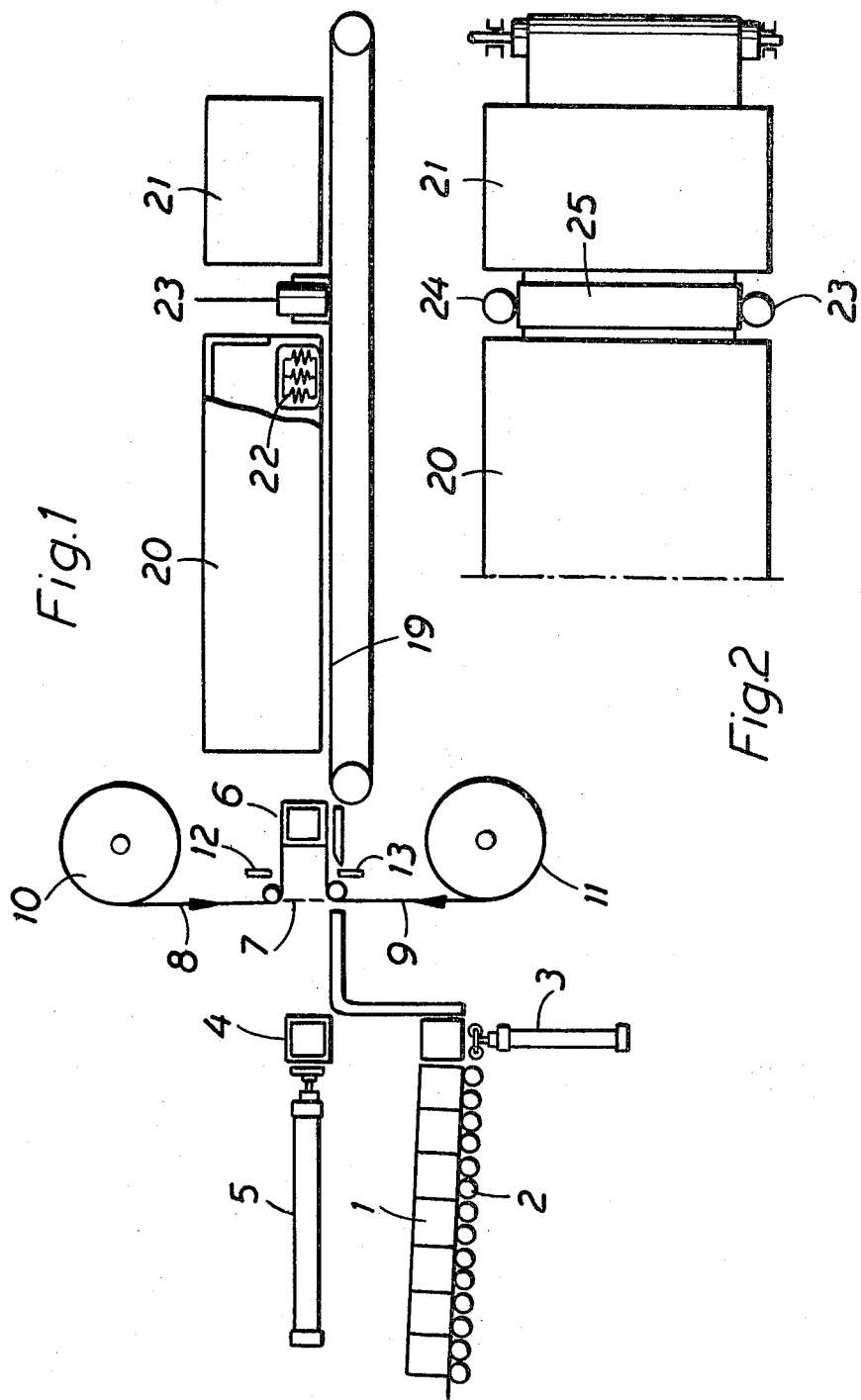

METHOD FOR PACKAGING

This invention relates to processes of packaging articles. More particularly, the invention relates to a method for providing a substantially prismatic or cylindrical article having two parallel, plane end faces with a close-fitting, air-tight plastic envelope.

The article which is to be provided with a plastic envelope may, for instance, be a pile or bundle of identical objects which may or may not be held together as a unit by suitable means applied prior to the application of the plastic envelope, or the article may be a carton or the like previously filled with the goods to be packaged.

In a known plastic packaging process, a tubular sheath of a heat shrinkable plastic material is applied around the article to be protected, the length of said sheath exceeding the length of the article so as to provide projecting end portions of the sheath, whereupon the sheath is subjected to sufficient heat to make it shrink into tight engagement with the article. To ensure complete coverage of the end faces of the article, the projecting end portions of the sheath are given sufficient length to provide, after completion of the shrinking operation, a central butt or stub sticking out from the otherwise plane end face of the package. Said butt or stub is subsequently flattened down against and welded on to the surrounding part of the plastic envelope in an additional operation. The resulting weld has a somewhat untidy appearance and is not always quite air-tight.

The principal object of the invention is to provide an improved plastic packaging process of the kind above referred to avoiding the disadvantages just mentioned.

The method according to the invention generally comprises the following four steps:

a. A tubular sheath of a heat shrinkable plastic material is applied around said article, said sheath projecting at both ends beyond said plane end faces by an amount adjusted so as to cause each of said projecting portions to form, on shrinking, a plane end portion having a central orifice confined by the edge of the sheath. The sheath referred to may, as known per se, be a piece cut off from a pre-manufactured length of tubular plastic wrapping material, or it may be produced by welding together the longitudinal edges of a piece of plastic foil wrapped around the article. The properties of the sheath material have to be such as to cause the principal shrinkage resulting from the subsequent heating step to occur in the circumferential direction. Some shrinkage in the axial direction is allowable, but is not necessary and generally not desirable.

b. A piece of non-shrinkable plastic sheet material is applied to each of the plane end faces of the article. The order of the steps (a) and (b) is arbitrary. That is, the pieces of plastic sheet material may be applied to the plane end faces of the article either before or after or simultaneously with the application of the sheath to the article.

c. The sheath is subjected to sufficient heat to cause the projecting end portions of the sheath to shrink into plane shape.

d. Each of the end portions of the sheath is welded to the underlying piece of plastic material by a weld surrounding the central orifice of the end portion.

In the accompanying drawings exemplifying the invention,

FIG. 1 is a schematic side elevation of a packaging line,

FIG. 2 is a top plan view of part of the packaging line of FIG. 1,

Figure 3:
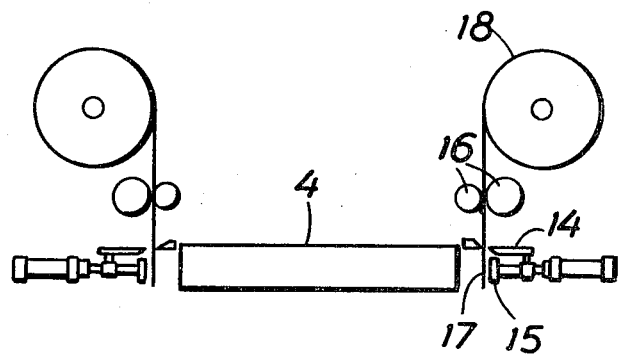
FIG. 3 is an end elevational, schematic view of an automatic 1–patch applicating apparatus cooperating with the apparatus of FIG. 1–2.

The articles 1 to be encased in plastic sheet material may, for instance, be cartons filled with coated welding electrodes. The articles are advanced along a rollerway 2 to a hydraulic or pneumatic lifter 3 adapted to move one article at a time to a position 4 from which it is moved by a hydraulic or pneumatic pusher 5 to a position 6. During the travel from position 4 to position 6, the article encounters and pulls forward a pair of plastic sheets 8, 9 connected by a weld at 7, thus causing said sheets to form an open loop around the article. The plastic sheets have a width exceeding the length of the article and are each supplied by a spool 10, 11, respectively. The ends of the loop are brought together by the reciprocating tools 12, 13, which are also adapted to weld together the ends of the loop and to cut off the sheath thus formed from the sheets 8, 9 in such a way that said sheets remain united by a weld. The tools 12, 13 as well as all of the parts of the machine hitherto described are known per se and require no detailed description.

According to the invention, the article is, prior to the application of the plastic sheath, fitted with a pair of plastic patches by the applicator shown in FIG. 3. During said operation the article is supported by the lifter 3, preferably in the position 4. A pusher 15 provided at each end of the article is adapted to push the end 17 of a plastic strip against the plane end face of the article. The strip is advanced by a pair of advancing rolls 16 from a spool 18. A knife 14 fitted on the pusher serves to cut off the strip end 17 to form a patch. The plastic strip may be coated with an adhesive on the side facing the article. As a rule, however, it is preferable to apply the adhesive to the article, for instance by means of a pair of glue applicator rollers adapted to engage the article during the lift towards position 4.

From position 6, the article is moved by a conveyor 19 through a heating tunnel 20 and a cooling tunnel 21. In the heating tunnel, the plastic sheath is heated to a temperature sufficient to cause the required shrinkage of the sheath. The shrinkage takes place in the longitudinal direction of the plastic strips 8, 9, that is, along the circumference of the sheath formed from said strips, resulting in a transversal contraction of the projecting end portions of the sheath. The length of each of said projecting end portions is so adjusted that said portions when shrunk do not entirely cover the end faces of the article, but form a plane surface surrounding an orifice confined by the edge of the sheath. Consequently, there will be formed no central stump or butt. The heating tunnel 20 includes a pair of heaters 22 arranged at the delivery end of the tunnel in order to heat the plastic patches attached to the end faces of the articles and the shrunk end portions of the plastic sheath to welding temperature. On leaving the heating tunnel the article (in position 25, FIG. 2) passes between a pair of pressure rolls 23, 24 adapted to exert a pressure sufficient to ensure the formation of an air-tight weld between the plastic patch and the overlying, shrunk portion of the sheath at each end of the article. The article then enters the cooling tunnel 21.

Figure 4:
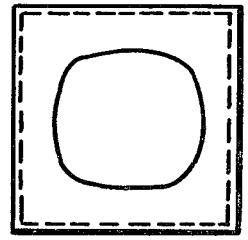
FIG. 4 is a view of the end face of a package produced by apparatus illustrated.

FIG. 4 shows the end face of the finished package, the outline of the plastic patch being indicated by dashed lines.

The shrinkable plastic sheet material may have any suitable composition and thickness. Excellent results have been obtained with shrinkable (pre-stretched) polythene foil having a thickness of 0.12 to 0.15 mm. The plastic patches should consist of normal (non-shrinkable) material.

The length of the projecting ends of the plastic sheath is preferably decided with the aid of experiment. The following data may be stated by way of example:

Size of end face: 65 × 65 mm
Sheath material: Pre-stretched polythene foil 0.12 mm.
Length of each of the projecting end portions of the sheath: 15 to 20 mm.

I claim:

1. The method of providing a substantially prismatic or cylindrical article having two parallel, plane end faces with a close-fitting, air-tight plastic envelope, comprising the steps of
   a. applying a tubular sheath of a heat shrinkable plastic material around said article, said sheath projecting at both ends beyond said plane end faces by an amount adjusted so as to cause each of said projecting portions to form, on shrinking, a plane end portion having a central orifice confined by the edge of the sheath,
   b. applying a piece of non-shrinkable plastic sheet material to each of the plane end faces of the article,
   c. subjecting said sheath to sufficient heat to cause the projecting end portions of the sheath to shrink into plane shape,
   d. heating the pieces of non-shrinkable plastic material and the shrunk end portions of the sheath to welding temperature, and
   e. advancing the article while said shrunk end portions are still at welding temperature between a pair of pressure rollers subjecting the end faces of the article to a mechanical pressure sufficient to produce an air-tight weld between said shrunk end portions and the underlying rims of the pieces of plastic material, the order of said steps (a) and (b) being arbitrary.

* * * * *